(12) United States Patent
Kim et al.

(10) Patent No.: US 12,528,974 B2
(45) Date of Patent: Jan. 20, 2026

(54) POLISHING SLURRY COMPOSITION

(71) Applicant: KCTECH CO., LTD., Gyeonggi-do (KR)

(72) Inventors: Jung Hun Kim, Gyeonggi-do (KR); Jun Ha Hwang, Gyeonggi-do (KR); O Seong Kwon, Gyeonggi-do (KR)

(73) Assignee: KCTECH CO., LTD., Gyeonggi-do (KR)

( * ) Notice: Subject to any disclaimer, the term of this patent is extended or adjusted under 35 U.S.C. 154(b) by 218 days.

(21) Appl. No.: 18/281,558

(22) PCT Filed: Mar. 7, 2022

(86) PCT No.: PCT/KR2022/003137
§ 371 (c)(1),
(2) Date: Sep. 11, 2023

(87) PCT Pub. No.: WO2022/231115
PCT Pub. Date: Nov. 3, 2022

(65) Prior Publication Data
US 2024/0158667 A1 May 16, 2024

(30) Foreign Application Priority Data

Apr. 30, 2021 (KR) .................. 10-2021-0056801

(51) Int. Cl.
*C09G 1/02* (2006.01)
(52) U.S. Cl.
CPC ..................... *C09G 1/02* (2013.01)
(58) Field of Classification Search
None
See application file for complete search history.

(56) References Cited

U.S. PATENT DOCUMENTS

| 2008/0311750 A1* | 12/2008 | Izumi | B24B 37/044 |
| | | | 438/693 |
| 2015/0315417 A1* | 11/2015 | Lau | G09G 1/02 |
| | | | 252/79.1 |
| 2019/0092974 A1* | 3/2019 | Tseng | H01L 21/31053 |
| 2020/0032106 A1* | 1/2020 | Iwano | C09G 1/02 |
| 2020/0102477 A1* | 4/2020 | Chen | B24B 37/044 |

FOREIGN PATENT DOCUMENTS

| CN | 107735478 | | 2/2018 | |
| JP | 2004331686 | | 11/2004 | |
| JP | 2019102476 | | 6/2019 | |
| KR | 20140059328 | | 5/2014 | |
| KR | 20150019008 | | 2/2015 | |
| KR | 20180068423 | | 6/2018 | |
| KR | 20200062733 | | 6/2020 | |
| KR | 20200062796 | | 6/2020 | |
| KR | 20200062796 A | * | 6/2020 | ........... C09K 3/1409 |
| KR | 20200082046 | | 7/2020 | |
| WO | 2005110679 | | 11/2005 | |
| WO | 2019187977 | | 10/2019 | |
| WO | 2020262234 | | 12/2020 | |

OTHER PUBLICATIONS

Jianfeng Luo et al., "Material Removal Mechanism in Chemical Mechanical Polishing: Theory and Modeling", IEEE Transactions on Semiconductor Manufacturing, May 2001, pp. 112-133, vol. 14, No. 2.

* cited by examiner

*Primary Examiner* — Shamim Ahmed
(74) *Attorney, Agent, or Firm* — JCIPRNET

(57) ABSTRACT

The present disclosure relates to a polishing slurry composition and to a polishing slurry composition including nanoceria abrasive particles and a water-soluble compound including an intramolecular hydrophilic group, and further selectively including at least one from among an amphoteric compound including an intramolecular carboxyl group and amine group, a surface modifier including an organic acid, and a pH adjuster.

11 Claims, No Drawings

POLISHING SLURRY COMPOSITION

TECHNICAL FIELD

The present disclosure relates to a polishing slurry composition including nanoceria abrasive particles.

DESCRIPTION OF RELATED ART

A chemical mechanical polishing (CMP) process is performed by injecting a slurry containing abrasive particles onto a substrate and using a polishing pad mounted on a polishing device. Here, the abrasive particles receive pressure from the polishing device to mechanically polish the surface, and chemical components contained in the polishing slurry composition chemically react the surface of the substrate to chemically remove a surface portion of the substrate.

In general, there are various types of polishing slurry compositions depending on the type and characteristics of an object to be removed. Among them, a polishing slurry composition for selectively removing a specific film to be polished is very diverse, but in recent semiconductor device structures, a slurry composition capable of simultaneously polishing a silicon oxide film, a silicon nitride film, and a polysilicon film is required. However, in a slurry composition according to a related art, it is impossible to selectively polish a silicon oxide film, a silicon nitride film, and a polysilicon film, a desired level of polishing speed is not achieved, or defects and scratches occur. In addition, agglomeration occurs due to low dispersion stability. Moreover, when ceria particles have angular crystal grains and a broad particle diameter distribution, micro-scratches on the polysilicon film inevitably occur. Furthermore, to minimize defects and scratches of a polishing film and reduce dishing and erosion values in a pattern, the necessity of applying small-sized particles is increasing.

When the size of ceria particles is 40 nanometers (nm) or less, a polishing rate of an insulating film is extremely low, and when the size is 100 nm or greater, the number of micro-scratches rapidly increases due to sharp crystal faces of a polyhedral structure. This indicates that a polishing rate of a polishing film is reduced due to a reduction in the pressure between polishing films of abrasive particles as the particle size decreases, and that when the particle size becomes less than a specific size, the polishing mechanism changes and the number of inactive abrasive particles increases. Theoretically, when the particle size decreases, some particles follow a "hydrodynamic contact model". This is proposed in the paper "IEEE TRANSACTIONS ON SEMICONDUCTOR MANUFACTURING, VOL. 14, NO. 2, MAY 2001". The polishing mechanism varies depending on a distance between a polishing pad and particles or between particles and a polishing surface in a CMP device. As the particle size decreases, the polishing rate decreases due to inactive abrasive particles.

DISCLOSURE OF THE INVENTION

Technical Goals

To solve the above-mentioned problems, the present disclosure provides a polishing slurry composition that may provide an appropriate dispersion environment for ceria abrasive particles to prevent inactive abrasive particles from being generated due to a reduction in a particle size and allow abrasive particles to uniformly participate in a polishing process, to enhance a polishing rate of a polishing film.

However, the technical goal obtainable from the present disclosure is not limited to those described above, and other goals not mentioned above can be clearly understood by one of ordinary skill in the art to which the present disclosure pertains from the following description.

Technical Solutions

According to an embodiment of the present disclosure, there is provided a polishing slurry composition including nanoceria abrasive particles; and a water-soluble compound including an intramolecular hydrophilic group. A result value S of Equation 1 below may be in a range of 0.9 to 1.1.

$$S = \frac{A*(b)^{-1/3}}{B*(a)^{-1/3}} \qquad \text{[Equation 1]}$$

(in Equation 1,
a: a primary particle size of a reference ceria abrasive particle
b: a primary particle size of the nanoceria abrasive particles
A: a polishing rate of a target film of a polishing slurry composition including ceria abrasive particles with the primary particle size a
B: a polishing rate of a target film of a polishing slurry composition including ceria abrasive particles with the primary particle size b)

According to an embodiment of the present disclosure, the primary particle size b may be a primary particle size of 30 nanometers (nm) or less.

According to an embodiment of the present disclosure, the abrasive particles may be included in an amount of 0.0001% by weight (wt %) to 5 wt % in the polishing slurry composition.

According to an embodiment of the present disclosure, the abrasive particles may be included in an amount of 0.001 wt % to 1 wt % in the polishing slurry composition.

According to an embodiment of the present disclosure, a molecular weight of the water-soluble compound may be less than "3000".

According to an embodiment of the present disclosure, the water-soluble compound may include a polymer, a copolymer, or both, and each of the polymer and the copolymer may include at least one monomer selected from a group consisting of alkylene glycol, oxyalkylene alkyl ether, oxyalkylene alkenyl ether, oxyalkylene alkyl aryl ether, and oxyalkylene alkyl ether carboxylic acid.

According to an embodiment of the present disclosure, the water-soluble compound may include a polymer, a copolymer, or both, and each of the polymer and the copolymer may include at least one monomer selected from a group consisting of alkyl acrylate; alkyl (meth)acrylate; (meth)acrylate containing an aliphatic ring or an aromatic ring; and acrylate containing an aliphatic ring or an aromatic ring.

According to an embodiment of the present disclosure, an amphoteric compound may be further included. The amphoteric compound may include an amphoteric amino acid, an organic acid containing an amine group and a carboxyl group, or both.

According to an embodiment of the present disclosure, the amphoteric compound may have a PI value of 5.5 to 6.5 and a molecular weight of 1000 or less.

According to an embodiment of the present disclosure, the amphoteric amino acid may include at least one selected from a group consisting of lysine, methionine, cysteine, tyrosine, glycine, glutamic acid, alanine, serine, asparagine, phenylalanine, threonine, valine, leucine, isoleucine, proline, histidine, lysine, arginine, aspartic acid, tryptophan, glutamine, cysteine, betaine, cocomidopropylbetaine, lauryl betaine, stearyl betaine, laurylpropyl betaine, cocodimethyl carboxymethyl betaine, lauryldimethyl carboxymethyl betaine, lauryldimethyl alpha-carboxyethyl betaine, cetyl dimethyl carboxymethyl betaine, aminocarboxylate, imidazolium betaine, 2-alkyl-N-carboxymethyl-N-hydroxyethyl-imidazolium betaine, lauryldimethylamine oxide, and lecithin.

According to an embodiment of the present disclosure, the organic acid containing the amine group and the carboxyl group may include at least one selected from a group consisting of sarcosine, aminobutyric acid (4-aminobutyric acid), diaminobutyric acid, laurylpropyl betaine, ornithine, cocomidopropyl betaine, theanine, aminoadipic acid, iminodiacetic acid, nitrilotriacetic acid, anthranilic acid, 3-aminobenzoic acid, 4-aminobenzoic acid, 3-amino-1,2,4-triazole-5-carboxylic acid, 1,2,3,4-tetrahydroisoquinoline-3-carboxylic acid, pipecolic acid, nipecotic acid, isonipecotic acid, 4-amino-3-hydroxybutyric acid, 6-aminohexanoic acid (aminocaproic acid), 2-amino-2-thiazoline-4-carboxylic acid, 3-amino-3-methyl benzoic acid, 3-aminomethylbutanoic acid, 5-aminopentanoic acid, 2-aminothiopheneacetic acid, aminonaphthoic acid, 3-aminopyrazo 4-carboxylic acid, 2-amino-4-pentenoic acid, 3-aminobutyric acid, aminolevulinic acid, and 8-aminocaprylic acid.

According to an embodiment of the present disclosure, the amphoteric compound may be included in an amount of 0.001 wt % to 1 wt % in the polishing slurry composition.

According to an embodiment of the present disclosure, a surface modifier including an organic acid may be further included, and the organic acid may include a monocarboxylic acid.

According to an embodiment of the present disclosure, the monocarboxylic acid may include at least one selected from a group consisting of formic acid, acetic acid, propionic acid, butyric acid, valeric acid, hexanoic acid, heptanoic acid, caprylic acid, nonanoic acid, decanoic acid, undecylenic acid, lauric acid, tridecylic acid, myristic acid, pentadecanoic acid, palmitic acid, phenylacetic acid, 2-phenylpropionic acid, triphenylacetic acid, mandelic acid, hydrocinnamic acid, o-, p-, m-tolylacetic acid, 4-hydroxyvphenyl acetic acid, benzoic acid, toluic acid, dimethylbenzoic acid, dichlorophenylacetic acid, naphthoic acid (1-naphthoic acid, 2-naphthoic acid, etc.), and salicylic acid.

According to an embodiment of the present disclosure, the organic acid may be included in an amount of 0.001 wt % to 0.1 wt % in the polishing slurry composition.

According to an embodiment of the present disclosure, the pH adjuster may be further included. The pH adjuster may include an acidic material, a basic material, or both. The acidic material may include at least one selected from a group consisting of hydrochloric acid, sulfuric acid, nitric acid, phosphoric acid, perchloric acid, bromic acid, perchloric acid, hydrofluoric acid, iodic acid, nitrous acid, persulfuric acid, sulfurous acid, hyposulfurous acid, boronic acid, iodic acid, phosphoric acid, phosphorous acid, hypophosphorous acid, superphosphoric acid, chlorous acid, hypochlorous acid, perchloric acid, bromous acid, hypobromous acid, perbromic acid, hypoiodous acid, periodic acid, hydrogen fluoride, boron trifluoride, tetrafluoroboric acid, phosphorus hydrofluoric acid, and salts thereof. The basic material may include at least one selected from a group consisting of ammonium methyl propanol (AMP), tetramethylammonium hydroxide (TMAH), ammonium hydroxide, ammonia, potassium hydroxide, sodium hydroxide, magnesium hydroxide, rubidium hydroxide, cesium hydroxide, sodium bicarbonate, sodium carbonate, imidazole, and salts thereof.

Effects

The present disclosure may provide a polishing slurry composition that may increase a polishing process participation rate of abrasive particles in the polishing slurry composition by preventing the number of inactive abrasive particles from being increased due to a change in the polishing mechanism when the size of the abrasive particles decreases. In other words, when the size of particles decreases, polishing may be performed using the polishing mechanism through a "hydrodynamic contact model", and the number of inactive particles may increase, and for example, the polishing rate may decrease at a particle size of 30 nanometers (nm) or less. However, the polishing slurry composition of the present disclosure may provide an appropriate dispersion environment of abrasive particles in the polishing slurry composition and may increase the polishing process participation rate of the abrasive particles even when the size of the abrasive particles decreases, to enhance a polishing rate of a polishing film.

BEST MODE FOR CARRYING OUT THE INVENTION

Hereinafter, embodiments of the present disclosure will be described in detail. In the description of the present disclosure, detailed description of well-known related functions or configurations will be omitted when it is deemed that such description will cause ambiguous interpretation of the present disclosure. In addition, the terminologies used herein are for the purpose of appropriately describing embodiments of the present disclosure, and may vary depending on the intention of users or operators or customs in the art to which the present disclosure belongs. Therefore, terms used herein should be defined based on the content throughout the present specification.

In the whole specification, when one member is positioned "on" another member, this not only includes a case that the one member is brought into contact with the other member, but also includes a case that another member exists between two members.

It will be understood throughout the whole specification that, when one part "includes" or "comprises" one component, the part does not exclude other components but may further include the other components.

Hereinafter, a polishing slurry composition according to the present disclosure will be described in detail with reference to embodiments. However, the present disclosure is not limited to the embodiments.

The present disclosure relates to a polishing slurry composition. According to an embodiment of the present disclosure, the polishing slurry composition may include ceria abrasive particles; and a water-soluble compound, and may selectively further include at least one of an amphoteric compound, a surface modifier, and a pH adjuster.

According to an embodiment of the present disclosure, the present disclosure is to provide a polishing slurry composition that may increase a polishing rate and reduce dishing, erosion, scratches, and the like, by increasing the number of active abrasive particles actively participating in a polishing process. The polishing rate may be proportional to a contact area between abrasive particles and a polishing surface. Referring to the "Journal of The Electrochemical Society, 147 (9) 3523-3528 (2000)", it can be confirmed that the polishing rate increases as the specific surface area of particles increases. However, if the size of abrasive particles decreases, the contact area between the abrasive particles and the polishing surface may decrease, or the number of abrasive particles inactively participating in the polishing process may increase, which may cause a reduction in the polishing rate. In the polishing slurry composition according to the present disclosure, when a primary particle size and the polishing rate of nanoceria abrasive particles are substituted into the following Equation 1, a result value S of Equation 1 may be in a range of 0.9 to 1.1, and desirably a value close to "1" may be obtained. In other words, the polishing slurry composition according to the present disclosure may provide an appropriate dispersion environment for nanoceria abrasive particles, to prevent the number of inactive abrasive particles from being increased due to a reduction in the size of abrasive particles, and may provide an environment in which (almost) all the nanoceria abrasive particles included in the polishing slurry composition may uniformly participate in the polishing process. For example, the polishing rate may be increased even when nanoceria abrasive particles having a primary particle size of 30 nanometers (nm) or less are applied.

$$S = \frac{A*(b)^{-1/3}}{B*(a)^{-1/3}} \quad \text{[Equation 1]}$$

In Equation 1, a denotes a primary particle size of a reference abrasive particle, b denotes a primary particle size of an abrasive particle according to the present disclosure, A denotes a polishing rate of a target film to be polished (hereinafter, referred to as a "target film") in a polishing slurry composition including ceria abrasive particles with the primary particle size a, and B denotes a polishing rate of a target film of a polishing slurry composition including ceria abrasive particles with the primary particle size b. For example, the primary particle size a may correspond to an abrasive particle having a primary particle size of 30 nm (or greater) to 40 nm, and the primary particle size b may correspond to an abrasive particle having a primary particle size of 30 nm or less, 20 nm or less, or 10 nm or less. The primary particle sizes a and b may be different from each other.

According to an embodiment of the present disclosure, a method of preparing metal oxide particles known in the art to which the present disclosure pertains may be used to prepare the ceria abrasive particles without particular limitation. However, to prepare the ceria abrasive particles, a hydrothermal synthesis method, a sol-gel method, a coprecipitation method, a spray drying method, a thermal evaporation method, and the like may desirably be used, and a cerium trivalent precursor may be used. The ceria abrasive particles may have an (average) primary particle size of 30 nm or less; 20 nm or less; or 10 nm or less. When the particle size of the ceria abrasive particles is included within the above particle size range, dispersion stability in the polishing slurry composition may be excellent, and performance degradation in a long-term polishing process may be prevented.

In an example of the present disclosure, the ceria abrasive particles having the primary particle size may have a specific surface area of 31 m 2/g or greater; 40 m 2/g or greater; 31 m 2/g to 200 m 2/g; or 40 m 2/g to 150 m 2/g. When the specific surface area of the ceria abrasive particles is included within the above specific surface area range, the area of a contact portion with the target film may be sufficiently secured to provide a high level of polishing speed, and scratches and dishing generated on a surface of the target film may be lowered. The specific surface area may be measured by a Brunauer-Emmett-Teller (BET) method. For example, the specific surface area may be measured by a BET 6-point method by a nitrogen gas adsorption flow method using a porosimetry analyzer (Bell Japan Inc., Belsorp-II mini).

In an example of the present disclosure, the ceria abrasive particles may be included in an amount of 0.01% by weight (wt %) to 5 wt %, 0.05 wt % to 2 wt %; or 0.05 wt % to 1 wt % in the polishing slurry composition. When the amount of the ceria abrasive particles is less than 0.01 wt %, it may be difficult to secure a high level of polishing rate. When the amount of the ceria abrasive particles exceeds 5 wt %, dispersion stability of the abrasive particles may be reduced, the number of defects may increase, and it may be difficult to obtain an effect of suppressing an occurrence of dishing.

According to an embodiment of the present disclosure, the water-soluble compound may be a water-soluble compound including an intramolecular hydrophilic group. Thus, an environment in which (almost) all ceria abrasive particles may uniformly participate in the polishing process may be provided by controlling a concentration and a molecular weight of each of the water-soluble compound having the hydrophilic group and an amphoteric compound having an amine group that will be described below, and accordingly, the slurry composition may be designed so that a calculated value of Equation 1 approaches "1", to increase a polishing process participation rate and enhance the polishing rate without a rapid change in the contact area with the target film in the polishing process of nanoceria particles.

As an example of the present disclosure, the water-soluble compound may include at least one of a single molecule, a monomer, a polymer, and a copolymer which each have a hydrophilic group. For example, the hydrophilic group may be a hydroxyl group, a carboxyl group, an ether group, an ester group, an amino group, and the like. The water-soluble compound may include an alkylene glycol-based compound, an acrylate-based compound, or both, and the alkylene glycol-based compound and the acrylate-based compound may each refer to a moiety in a molecule, a single molecule, a monomer, a polymer, and a copolymer.

In an example of the present disclosure, the alkylene glycol-based compound may include at least one of a monomer, a polymer, a copolymer, and salts thereof which each include at least one selected from alkylene glycol, oxyalkylene alkyl ether, oxyalkylene alkenyl ether, oxyalkylene alkyl aryl ether, and oxyalkylene alkyl ether carboxylic acid, and may be selected from, for example, polyalkylene glycol, polyoxyalkylene alkyl ether, polyoxyalkylene alkenyl ether, polyoxyalkylene alkyl aryl ether, and polyoxyalkylene alkyl ether carboxylic acid (alkyl and alkylene are selected from 1 to 20 carbon atoms; 1 to 10 carbon atoms; or 2 to 5 carbon atoms, alkenyl is selected from 2 to 20 carbon atoms, and aryl is selected from 5 to 30 carbon atoms). More specifically, the water-soluble compound may be polyethylene glycol, polypropylene glycol, poly(isopropylene glycol), polybutylene glycol, polyoxyethylene methyl ether, polyethylene glycol sulfonic acid, polyvinyl alcohol, a polyethylene oxide-propylene oxide copolymer, a poly(ethylene glycol)-end capped poly(propylene glycol) (PEG-PPG-PEG block copolymer), and the like.

In an example of the present disclosure, the acrylate-based compound may include at least one of a monomer, a polymer, a copolymer, and salts thereof which each include at least one selected from a group consisting of alkyl acrylate; alkyl (meth)acrylate; (meth)acrylate containing an aliphatic ring or an aromatic ring; and acrylate containing an aliphatic ring or an aromatic ring. The alkyl may be selected from 1 to 30 carbon atoms, the aliphatic ring may be selected from 4 to carbon atoms, and the aromatic ring may be selected from 6 to 30 carbon atoms. More specifically, the acrylate-based compound may include at least one selected from a group consisting of a polymer, a copolymer, and salts thereof which each include at least one monomer among acrylate, methyl acrylate, ethyl acrylate, propyl acrylate, isopropyl acrylate, butyl acrylate, isobutyl acrylate, pentyl acrylate, isopentyl acrylate, hexyl acrylate, isohexyl acrylate, heptyl acrylate, octyl acrylate, isooctyl acrylate, nonyl acrylate, lauryl acrylate, carboxyethyl acrylate, carboxyethyl acrylate oligomers, (methacryloyloxy)ethyl maleate, (methacryloyloxy)ethyl succinate, and ammonium acrylate, cyclopentyl methacrylate, cyclohexyl methacrylate, benzyl methacrylate, cyclohexyl acrylate, and 2-phenoxyethyl acrylate; and a copolymer of maleic acid/acrylate, a copolymer of fumaric acid/acrylate, a copolymer of itaconic acid/acrylate, a copolymer of citraconic acid/acrylate, a copolymer of acrylic acid/acrylate, a copolymer of methacrylic acid/acrylate, a copolymer of crotonic acid/acrylate, a copolymer of vinylacetic acid/acrylate, a polyacrylamide/acrylic acid copolymer, a polyacrylic acid/sulfonic acid copolymer, a polysulfonic acid/acrylamide copolymer, polyacrylamide methylpropane sulfonic acid, a polyacrylic acid/styrene copolymer polyacrylic acid-malonic acid copolymer carboxymethyl sulfoethyl cellulose polyacrylic acid, polyacryl-maleic acid, polymethacrylic acid, and polymethacrylic ammonium salt.

In an example of the present disclosure, the water-soluble compound may be included in an amount of 0.001 wt % to 1 wt %; 0.01 wt % to 1 wt %; or 0.1 wt % to 1 wt % in the polishing slurry composition. When the amount of the water-soluble compound is included within the above range, the polishing process participation rate of the abrasive particles may be increased and the polishing rate may be enhanced.

In an example of the present disclosure, the molecular weight of the water-soluble compound may be less than 3000. For example, when the molecular weight is included within the above molecular weight range, defects such as dishing, scratches, and the like may be reduced while securing a good polishing rate by preventing the polishing rate from decreasing due to cushioning between abrasive particles and the target film caused by an increase in the molecular weight.

According to an embodiment of the present disclosure, the amphoteric compound may be used to enhance the polishing rate and dispersion stability of the polishing slurry composition. The amphoteric compound may be a compound that acts as a base for acidic materials and acts as an acid for basic materials. In the present disclosure, the amphoteric compound may be a compound containing an amine group and a carboxyl group and may include an amino acid having amphoteric charge; an organic acid containing an amine group and a carboxyl group; or both.

In an example of the present disclosure, the amino acid may have both a carboxylic group (—COOH) indicating an acidity and an amino group (—$NH_2$) indicating a basicity in a single molecule. The amino acid may act as an acid or a base depending on pH if dissolved in water, and accordingly, the amino acid may be referred to as an amphoteric compound. Depending on pH of a solution, both a (base) cation (—$NH_2+H^+>>>$—$NH_3^+$) that accepts hydrogen ions (W) and an (acid) anion (—COOH>>>—$COO^-+H^+$) that releases hydrogen ions ($H^+$) may be contained in a molecule structure, and accordingly an amphoteric ion may be formed. According to an embodiment of the present disclosure, the amino acid may include at least one selected from a group consisting of lysine, methionine, cysteine, tyrosine, glycine, glutamic acid, alanine, serine, asparagine, phenylalanine, threonine, valine, leucine, isoleucine, proline, histidine, lysine, arginine, aspartic acid, tryptophan, glutamine, cysteine, betaine, cocomidopropylbetaine, lauryl betaine, stearyl betaine, laurylpropyl betaine, cocodimethyl carboxymethyl betaine, lauryldimethyl carboxymethyl betaine, lauryldimethyl alpha-carboxyethyl betaine, cetyl dimethyl carboxymethyl betaine, aminocarboxylate, imidazolium betaine, 2-alkyl-N-carboxymethyl-N-hydroxyethylimidazolium betaine, lauryldimethylamine oxide, and lecithin.

In an example of the present disclosure, the organic acid containing the amine group and the carboxyl group may include at least one selected from a group consisting of sarcosine, aminobutyric acid (4-aminobutyric acid), diaminobutyric acid, laurylpropyl betaine, ornithine, cocomidopropyl betaine, theanine, aminoadipic acid, iminodiacetic acid, nitrilotriacetic acid, anthranilic acid, 3-aminobenzoic acid, 4-aminobenzoic acid, 3-amino-1,2,4-triazole-5-carboxylic acid, 1,2,3,4-tetrahydroisoquinoline-3-carboxylic acid, pipecolic acid, nipecotic acid, isonipecotic acid, 4-amino-3-hydroxybutyric acid, 6-aminohexanoic acid (aminocaproic acid), 2-amino-2-thiazoline-4-carboxylic acid, 3-amino-3-methyl benzoic acid, 3-aminomethylbutanoic acid, 5-aminopentanoic acid, 2-aminothiopheneacetic acid, aminonaphthoic acid, 3-aminopyrazo 4-carboxylic acid, 2-amino-4-pentenoic acid, 3-aminobutyric acid, aminolevulinic acid, and 8-aminocaprylic acid.

In an example of the present disclosure, the amphoteric compound may have a PI value of 5.5 to 6.5 and a molecular weight of 1000 or less. When the PI value and the molecular weight are included within the above ranges, it may be advantageous to increase the polishing process participation rate of the abrasive particles, to enhance the polishing rate of the target film and reduce defects such as dishing, erosion, and the like.

For example, the amphoteric compound may be included in an amount of 0.001 wt % to 1 wt %; or 0.01 wt % to 0.5 wt % in the polishing slurry composition. When the amount of the amphoteric compound is included within the above range, a reduction in a contact area between abrasive nanoparticles and the target film may be prevented so that the polishing rate of the target film may be enhanced.

According to an embodiment of the present disclosure, the surface modifier may include an organic acid. The organic acid may include a monocarboxylic acid having one carboxyl group, and the monocarboxylic acid may include at least one of an aliphatic monocarboxylic acid and an aromatic monocarboxylic acid. The aliphatic monocarboxylic acid may include at least one selected from a group consisting of formic acid, acetic acid, propionic acid, butyric acid, valeric acid, hexanoic acid, heptanoic acid, caprylic acid, nonanoic acid, decanoic acid, undecylenic acid, lauric acid, tridecylic acid, myristic acid, pentadecanoic acid, and palmitic acid. The aromatic monocarboxylic acid may include at least one selected from a group consisting of phenylacetic acid, 2-phenylpropionic acid, triphenylacetic acid, mandelic acid, hydrocinnamic acid, o-, p-, m-tolylacetic acid, 4-hydroxyvphenyl acetic acid, benzoic acid, toluic acid, dimethylbenzoic acid, dichlorophenylacetic acid, naphthoic acid (1-naphthoic acid, 2-naphthoic acid, etc.), and salicylic acid.

In an example of the present disclosure, the organic acid may be included in an amount of 0.001 wt % to 0.1 wt %; or 0.005 wt % to 0.1 wt % in the polishing slurry composition. When the amount of the organic acid is included within the above range, aggregation of particles may be prevented, which may be advantageous in securing a constant polishing rate of a film through maintaining of a constant specific surface area of particles.

According to an embodiment of the present disclosure, the pH adjuster may include an acidic material, a basic material, or both. The acidic material may include at least one selected from a group consisting of hydrochloric acid, sulfuric acid, nitric acid, phosphoric acid, perchloric acid, bromic acid, perchloric acid, hydrofluoric acid, iodic acid, nitrous acid, persulfuric acid, sulfurous acid, hyposulfurous acid, boronic acid, iodic acid, phosphoric acid, phosphorous acid, hypophosphorous acid, superphosphoric acid, chlorous acid, hypochlorous acid, perchloric acid, bromous acid, hypobromous acid, perbromic acid, hypoiodous acid, periodic acid, hydrogen fluoride, boron trifluoride, tetrafluoroboric acid, phosphorus hydrofluoric acid, and salts thereof. The basic material may include at least one selected from a group consisting of ammonium methyl propanol (AMP), tetramethylammonium hydroxide (TMAH), ammonium hydroxide, ammonia (an anhydride or an aqueous solution), potassium hydroxide, sodium hydroxide, magnesium hydroxide, rubidium hydroxide, cesium hydroxide, sodium bicarbonate, sodium carbonate, imidazole, and salts thereof. For example, the pH adjuster may be used in an amount suitable for adjusting pH of the polishing slurry composition to pH of 2 to 11, desirably, pH of 5 to 7.

According to an embodiment of the present disclosure, the polishing slurry composition may be used in a CMP process of a semiconductor wafer including at least one of a silicon nitride film, a silicon oxide film, a polysilicon film, and a silicon film. The polishing slurry composition may be used in a process of removing a silicon oxide film at a high polishing rate, or a process of stopping polishing on a polysilicon film while removing a silicon oxide film at a high polishing rate. In the polishing process, a polishing rate for the silicon oxide film may be in a range of 2,000 Å/min to 6,000 Å/min.

Hereinafter, the present disclosure will be described in more detail with reference to examples, however, the following examples are for illustrative purposes only and are not intended to limit the scope of the present disclosure.

Reference Example 1

According to Table 1, ceria particles (primary particle size, 32 nm, 0.1 wt %), polyethylene glycol (molecular weight: 600, 0.5 wt %), L-alanine (PI value 6.11, 0.1 wt %), formic acid (0.02 wt %), and a pH adjuster (ammonia) were mixed to prepare a polishing slurry composition with pH of 6.

Example 1

According to Table 1, ceria particles (primary particle size, 18 nm, 0.1 wt %), polyethylene glycol (molecular weight: 600, 0.5 wt %), L-alanine (PI value 6.11, 0.1 wt %), formic acid (0.02 wt %), and a pH adjuster (ammonia) were mixed to prepare a polishing slurry composition with pH of 6.

Example 2

According to Table 1, ceria particles (primary particle size, 7 nm, 0.1 wt %), polyethylene glycol (molecular weight: 600, 0.5 wt %), L-alanine (PI value 6.11, 0.1 wt %), formic acid (0.02 wt %), and a pH adjuster (ammonia) were mixed to prepare a polishing slurry composition with pH of 6.

Example 3

According to Table 1, ceria particles (primary particle size, 4 nm, 0.1 wt %), polyethylene glycol (molecular weight: 600, 0.5 wt %), L-alanine (PI value 6.11, 0.1 wt %), formic acid (0.02 wt %), and a pH adjuster (ammonia) were mixed to prepare a polishing slurry composition with pH of 6.

Example 4

According to Table 1, ceria particles (primary particle size, 7 nm, 0.1 wt %), polyoxyethylene polyglyceryl ethers (molecular weight: 1000, 0.5 wt %), L-vanillin (PI value 5.97, 0.1 wt %), acetic acid (0.02 wt %), and a pH adjuster (ammonia) were mixed to prepare a polishing slurry composition with pH of 6.

Example 5

According to Table 1, ceria particles (primary particle size, 7 nm, 0.1 wt %), polyoxyethylene polyglyceryl ethers (molecular weight: 1000, 0.5 wt %), L-(−)-proline (PI value 6.30, 0.1 wt %), acetic acid (0.02 wt %), and a pH adjuster (ammonia) were mixed to prepare a polishing slurry composition with pH of 6.

Example 6

According to Table 1, ceria particles (primary particle size, 7 nm, 0.1 wt %), polyoxyethylene polyglyceryl ethers (molecular weight: 1000, 0.5 wt %), L-(−)-proline (PI value 6.30, 0.1 wt %), butyric acid (0.02 wt %), and a pH adjuster (ammonia) were mixed to prepare a polishing slurry composition with pH of 6.

Comparative Example 1

According to Table 1, ceria particles (primary particle size, 52 nm, 0.1 wt %), polyethylene glycol (molecular weight: 600, 0.5 wt %), L-alanine (PI value 6.11, 0.1 wt %), formic acid (0.02 wt %), and a pH adjuster (ammonia) were mixed to prepare a polishing slurry composition with pH of 6.

Comparative Example 2

According to Table 1, wet ceria particles (primary particle size, 61 nm, 0.1 wt %), polyethylene glycol (molecular weight: 600, 0.5 wt %), L-alanine (PI value 6.11, 0.1 wt %), formic acid (0.02 wt %), and a pH adjuster (ammonia) were mixed to prepare a polishing slurry composition with pH of 6.

Comparative Example 3

According to Table 1, ceria particles (primary particle size, 7 nm, 0.1 wt %), polyethylene glycol (molecular weight: 600, 0.5 wt %), formic acid (0.02 wt %), and a pH adjuster (ammonia) were mixed to prepare a polishing slurry composition with pH of 6.

Comparative Example 4

According to Table 1, ceria particles (primary particle size, 7 nm, 0.1 wt %), polyethylene glycol (molecular weight: 600, 0.5 wt %), L-vanillin (PI value 5.97, 0.1 wt %), and a pH adjuster (ammonia) were mixed to prepare a polishing slurry composition with pH of 6.

Comparative Example 5

According to Table 1, ceria particles (primary particle size, 7 nm, 0.1 wt %), polyoxyethylene polyglyceryl ethers (molecular weight: 1000, 0.5 wt %), butyric acid (0.02 wt %), and a pH adjuster (ammonia) were mixed to prepare a polishing slurry composition with pH of 6.

Comparative Example 6

According to Table 1, wet ceria particles (primary particle size, 7 nm, 0.1 wt %), polyethylene glycol (molecular weight: 4000, 0.5 wt %), L-alanine (PI value 6.11, 0.1 wt %), formic acid (0.02 wt %), and a pH adjuster (ammonia) were mixed to prepare a polishing slurry composition with pH of 6.

Evaluation of Polishing Characteristics

A PETEOS-containing substrate was polished using the polishing slurry compositions of the reference example, the examples, and the comparative examples under the polishing conditions described below.

[Polishing Conditions]
(1) Polishing equipment: ST #01 (KCT)
(2) Carrier rpm: 60/63
(3) Wafer Pressure: 2 psi
(4) Flow rate (ml/min): 200
(5) Pad: IC 1000
(6) Time: 60 s
(7) R-ring pressure: 4.5 psi To evaluate polishing characteristics, polishing speeds were measured when the PETEOS wafer substrates using the polishing slurry compositions according to the examples and comparative examples were polished, and the results are shown in Table 1. In addition, specific surface areas of the abrasive particles of the examples and comparative examples were measured by a BET method and are shown in Table 2.

TABLE 1

| | Ceria particles Particle size (Primary particle size) | wt % | Additive-1 Chemical 1 | Chemical 2 | Chemical 3 | PETEOS (Å/min) | Real Contact/Theory Contact |
|---|---|---|---|---|---|---|---|
| Reference Example 1 | 32 nm | 0.1 | A-1 | B-1 | C-1 | 2452 | — |
| Example 1 | 18 nm | 0.1 | A-1 | B-1 | C-1 | 3001 | 0.990 |
| Example 2 | 7 nm | 0.1 | A-1 | B-1 | C-1 | 4234 | 0.961 |
| Example 3 | 4 nm | 0.1 | A-1 | B-1 | C-1 | 5102 | 0.961 |
| Example 4 | 7 nm | 0.1 | A-2 | B-2 | C-2 | 4120 | 0.987 |
| Example 5 | 7 nm | 0.1 | A-2 | B-3 | C-2 | 4028 | 1.010 |
| Example 6 | 7 nm | 0.1 | A-2 | B-3 | C-3 | 4215 | 0.965 |
| Comparative Example 1 | 52 nm | 0.1 | A-1 | B-1 | C-1 | 4501 | 0.463 |
| Comparative Example 2 | 61 nm | 0.1 | A-1 | B-1 | C-1 | 5513 | 0.358 |
| Comparative Example 3 | 7 nm | 0.1 | A-1 | — | C-1 | 1985 | 2.05 |
| Comparative Example 4 | 7 nm | 0.1 | A-1 | B-2 | — | 2510 | 1.621 |
| Comparative Example 5 | 7 nm | 0.1 | A-2 | — | C-2 | 1854 | 1.225 |
| Comparative Example 6 | 7 nm | 0.1 | A-3 | B-1 | C-1 | 2105 | 1.933 |

A-1: PEG 600 (weight average molecular weight: 600)
A-2: POE (20) polyglyceryl ether (weight average molecular weight: 1,000)
A-3: PEG 4000 (weight average molecular weight: 4,000)
B-1: L-Alanine (PI value: 6.11)
B-2: L-Valine (PI value: 5.97)
B-3: L-(−)-Proline (PI value: 6.30)
C-1: Formic acid
C-2: Acetic acid
C-3: Butyric acid
*The primary particle size was confirmed by TEM.

Calculation was performed by substituting the polishing rate and the particle size of Table 1 into the Real Contact/Theory Contact equation below.

$$S = \frac{A*(b)^{-1/3}}{B*(a)^{-1/3}}$$

a: Primary particle size of ceria nanoparticles of Reference Example 1
A: PETEOS polishing rate of ceria nanoparticles having the primary particle size a
b: Primary particle size of ceria nanoparticles (particle size of an object for which a ratio calculation is desired)
B: PETEOS polishing rate of ceria nanoparticles having the primary particle size b

TABLE 2

|  | Particle size | Specific surface area (m²/g) |
|---|---|---|
| Example 3 | 4 nm | 138.5 |
| Example 2 | 7 nm | 86.7 |
| Example 1 | 18 nm | 48.2 |
| Reference Example 1 | 32 nm | 30.3 |
| Comparative Example 1 | 52 nm | 14.1 |
| Comparative Example 2 | 61 nm | 10.5 |

As shown in Table 1, when nano-size ceria particles having, for example, the particle size of 30 nm or less are applied, the polishing slurry composition according to the present disclosure may enhance dispersibility of the ceria particles to reduce a percentage of inactive abrasive particles in a polishing process, thereby preventing a reduction in a contact area with a target film. That is, the polishing slurry compositions of Examples 1 to 6 shown in Table 1 show values close to "1" when contact areas according to the polishing rates thereof are compared by substituting Reference Example 1 as a reference according to Equation 1, even when a wide range of nano-size particles are applied in the composition. Therefore, it is possible to reduce a generation of inactive particles in the polishing process of the nano-size ceria particles in the polishing slurry composition according to the present disclosure and to allow all particles to uniformly participate in the polishing process, to enhance the polishing rate.

While the embodiments have been described above, it will be apparent to one of ordinary skill in the art that various alterations and modifications in form and details may be made in these embodiments without departing from the spirit and scope of the claims and their equivalents. For example, suitable results may be achieved if the described techniques are performed in a different order and/or if described components are combined in a different manner and/or replaced or supplemented by other components or their equivalents. Therefore, other implementations, other embodiments, and equivalents to the claims are also within the scope of the following claims.

The invention claimed is:

1. A polishing slurry composition comprising:
nanoceria abrasive particles;
a water-soluble compound comprising an intramolecular hydrophilic group;
an amphoteric compound comprising an amphoteric amino acid with an isoelectric point (PI) value of 5.5 to 6.5; and
a surface modifier comprising a monocarboxylic acid,
wherein a molecular weight of the water-soluble compound is less than 3000,
a pH of the polishing slurry composition is 5 to 7,
a result value S of Equation 1 below is in a range of 0.9 to 1.1:

$$S = \frac{A*(b)^{-1/3}}{B*(a)^{-1/3}} \quad \text{[Equation 1]}$$

(in Equation 1,
a: a primary particle size of a reference ceria abrasive particle
b: a primary particle size of the nanoceria abrasive particles
A: a polishing rate of a target film of a polishing slurry composition comprising ceria abrasive particles with the primary particle size a
B: a polishing rate of a target film of a polishing slurry composition comprising ceria abrasive particles with the primary particle size b)
the primary particle size b is a primary particle size of 30 nm or less.

2. The polishing slurry composition of claim 1, wherein the nanoceria abrasive particles are included in an amount of 0.0001% by weight (wt %) to 5 wt % in the polishing slurry composition.

3. The polishing slurry composition of claim 1, wherein the water-soluble compound is included in an amount of 0.001 wt % to 1 wt % in the polishing slurry composition.

4. The polishing slurry composition of claim 1, wherein the water-soluble compound comprises a polymer, a copolymer, or both, wherein each of the polymer and the copolymer comprises at least one monomer selected from a group consisting of alkylene glycol, oxyalkylene alkyl ether, oxyalkylene alkenyl ether, oxyalkylene alkyl aryl ether, and oxyalkylene alkyl ether carboxylic acid.

5. The polishing slurry composition of claim 1, wherein the water-soluble compound comprises a polymer, a copolymer, or both, wherein each of the polymer and the copolymer comprises at least one monomer selected from a group consisting of alkyl acrylate; alkyl (meth)acrylate; (meth)acrylate containing an aliphatic ring or an aromatic ring; and acrylate containing an aliphatic ring or an aromatic ring.

6. The polishing slurry composition of claim 1, wherein the amphoteric compound has an isoelectric point (PI) value of 5.5 to 6.5, and
the amphoteric compound has a molecular weight of 1000 or less.

7. The polishing slurry composition of claim 1, wherein the amphoteric amino acid comprises at least one selected from a group consisting of lysine, methionine, cysteine, tyrosine, glycine, glutamic acid, alanine, serine, asparagine, phenylalanine, threonine, valine, leucine, isoleucine, proline, histidine, lysine, arginine, aspartic acid, tryptophan, glutamine, cysteine, betaine, cocomidopropylbetaine, lauryl betaine, stearyl betaine, laurylpropyl betaine, cocodimethyl carboxymethyl betaine, lauryldimethyl carboxymethyl betaine, lauryldimethyl alpha-carboxyethyl betaine, cetyl dimethyl carboxymethyl betaine, aminocarboxylate, imidazolium betaine, 2-alkyl-N-carboxymethyl-N-hydroxyethyl-imidazolium betaine, lauryldimethylamine oxide, and lecithin.

8. The polishing slurry composition of claim 1, wherein the amphoteric compound is included in an amount of 0.001 wt % to 1 wt % in the polishing slurry composition.

9. The polishing slurry composition of claim 1, wherein the monocarboxylic acid comprises at least one selected from a group consisting of formic acid, acetic acid, propionic acid, butyric acid, valeric acid, hexanoic acid, heptanoic acid, caprylic acid, nonanoic acid, decanoic acid, undecylenic acid, lauric acid, tridecylic acid, myristic acid, pentadecanoic acid, palmitic acid, phenylacetic acid, 2-phenylpropionic acid, triphenylacetic acid, mandelic acid, hydrocinnamic acid, o-, p-, m-tolylacetic acid, 4-hydroxyphenyl acetic acid, benzoic acid, toluic acid, dimethylbenzoic acid, dichlorophenylacetic acid, naphthoic acid (1-naphthoic acid, 2-naphthoic acid, etc.), and salicylic acid.

10. The polishing slurry composition of claim 1, wherein the surface modifier is included in an amount of 0.001 wt % to 0.1 wt % in the polishing slurry composition.

11. The polishing slurry composition of claim 1, further comprising a pH adjuster,
wherein the pH adjuster comprises an acidic material, a basic material, or both,
wherein the acidic material comprises at least one selected from a group consisting of hydrochloric acid, sulfuric acid, nitric acid, phosphoric acid, perchloric acid, bromic acid, perchloric acid, hydrofluoric acid, iodic acid, nitrous acid, persulfuric acid, sulfurous acid, hyposulfurous acid, boronic acid, iodic acid, phosphoric acid, phosphorous acid, hypophosphorous acid, superphosphoric acid, chlorous acid, hypochlorous acid, perchloric acid, bromous acid, hypobromous acid, perbromic acid, hypoiodous acid, periodic acid, hydrogen fluoride, boron trifluoride, tetrafluoroboric acid, phosphorus hydrofluoric acid, and salts thereof, and
wherein the basic material comprises at least one selected from a group consisting of ammonium methyl propanol (AMP), tetramethylammonium hydroxide (TMAH), ammonium hydroxide, ammonia, potassium hydroxide, sodium hydroxide, magnesium hydroxide, rubidium hydroxide, cesium hydroxide, sodium bicarbonate, sodium carbonate, imidazole, and salts thereof.

* * * * *